United States Patent
Imamura et al.

(10) Patent No.: US 8,515,438 B2
(45) Date of Patent: Aug. 20, 2013

(54) RADIO COMMUNICATION METHOD AND RADIO COMMUNICATION TERMINAL ACCOMMODATING APPARATUS

(75) Inventors: Daichi Imamura, Osaka (JP); Jun Hirano, Osaka (JP)

(73) Assignee: Panasonic Corporation, Osaka (JP)

( * ) Notice: Subject to any disclaimer, the term of this patent is extended or adjusted under 35 U.S.C. 154(b) by 70 days.

(21) Appl. No.: 12/780,833

(22) Filed: May 14, 2010

(65) Prior Publication Data

US 2010/0222093 A1 Sep. 2, 2010

Related U.S. Application Data

(62) Division of application No. 10/571,391, filed as application No. PCT/JP2004/013570 on Sep. 10, 2004, now abandoned.

(30) Foreign Application Priority Data

Sep. 12, 2003 (JP) .................................. 2003-322134

(51) Int. Cl.
H04W 72/00 (2009.01)
H04J 3/00 (2006.01)
H04B 7/212 (2006.01)
H04L 12/43 (2006.01)

(52) U.S. Cl.
USPC ..... 455/450; 455/451; 455/452.1; 455/452.2; 370/337; 370/347; 370/442; 370/458

(58) Field of Classification Search
USPC .............. 455/450–452.2, 455; 370/337, 347, 370/442, 458
See application file for complete search history.

(56) References Cited

U.S. PATENT DOCUMENTS 5,430,843 A * 7/1995 Sato et al. ..................... 709/225
6,285,892 B1 9/2001 Hulyalkar
(Continued)

FOREIGN PATENT DOCUMENTS

EP 0 784 387 7/1997
EP 1 343 340 9/2003
(Continued)

OTHER PUBLICATIONS

European Search Report dated Apr. 1, 2011.
(Continued)

*Primary Examiner* — Jean Gelin
*Assistant Examiner* — Dung Hong
(74) *Attorney, Agent, or Firm* — Dickinson Wright PLLC

(57) ABSTRACT

A technique capable of improving the communication throughput while maintaining the interchangeability with a radio communication system or radio communication method employing carrier sense in a conventional multiple access system is disclosed and, on the basis of this technique, a radio communication terminal accommodating apparatus determines the allocation order of communication right permitting the occupation of a radio transmission medium with respect to each of a plurality of radio transmission terminals and transmits a multiple-polling signal 311 including information on this order to the plurality of radio communication terminals at an arbitrary transmission timing acquired through the carrier sense. Thus, each of communication right time periods (communication right time periods 312 to 314) for which the occupation of the radio transmission medium is permissible is allocated to each of the plurality of radio communication terminals. In addition, a time sufficiently shorter than a guard time (carrier sense time) in a conventional system is employed as a time interval between communication right time periods adjacent to each other.

10 Claims, 12 Drawing Sheets

(56) References Cited

U.S. PATENT DOCUMENTS

| | | |
|---|---|---|
| 6,456,613 B1 | 9/2002 | Kato |
| 7,412,265 B2 | 8/2008 | Chen |
| 7,433,370 B1 | 10/2008 | Tymes |
| 2002/0105970 A1* | 8/2002 | Shvodian .................... 370/468 |
| 2002/0196769 A1 | 12/2002 | Ohmi |
| 2003/0078064 A1 | 4/2003 | Chan |
| 2004/0044784 A1* | 3/2004 | Hirano ........................ 709/232 |

FOREIGN PATENT DOCUMENTS

| | | |
|---|---|---|
| JP | 57-125550 | 8/1982 |
| JP | 1-146161 | 2/1999 |
| JP | 11-340991 | 12/1999 |
| JP | 2001-160859 | 6/2001 |
| JP | 2002-135199 | 5/2002 |
| JP | 2003-009220 | 1/2003 |
| JP | 2003-060655 | 2/2003 |
| JP | 2003-078534 | 3/2003 |
| WO | WO 02073895 A1 * | 9/2002 |

OTHER PUBLICATIONS

S. Mangold, et al., "IEEE 802.11e Wireless LAN for Quality of Service," Internet Citation, Feb. 2002, pp. 1-8.
Extended European Search Report dated Dec. 14, 2011.
PCT International Search Report dated Dec. 28, 2004.
ANSI/IEEE Std 802.11, 1999 Edition, "Information technology—Telecommunications and Information exchange between systems—Local and metropolitan area networks—Specific requirements Part 11: Wireless LAN Medium Access Control (MAC) and Physical Layer (PHY) Specifications, Section 9", pp. 70-97.

* cited by examiner

|  | OBJECT OF DETECTION | | | | |
|---|---|---|---|---|---|
| SUBJECT OF DETECTION | ① | ② | ③ | ④ | ⑤ |
| ① |  | ○ | × | ○ | ○ |
| ② | ○ |  | ○ | ○ | × |
| ③ | ○ | ○ |  | × | × |
| ④ | ○ | × | × |  | ○ |
| ⑤ | ○ | ○ | ○ | ○ |  |

RADIO COMMUNICATION METHOD AND RADIO COMMUNICATION TERMINAL ACCOMMODATING APPARATUS

This is a divisional application of application Ser. No. 10/571,391 filed Mar. 9, 2006, which is a national stage of PCT/JP2004/013570 filed Sep. 10, 2004, which is based on Japanese Application No. 2003-322134 filed Sep. 12, 2003, the entire contents of each of which are incorporated by reference herein.

TECHNICAL FIELD

The present invention relates to a radio communication method for use in a radio communication system designed to carry out the transmission/reception of data among a plurality of radio communication terminals, and a radio communication terminal accommodating apparatus made to accommodate a plurality of radio communication terminals in the radio communication system.

BACKGROUND ART

So far, a radio communication network, designed to conduct the interchange of data among a plurality of radio communication terminals, has been in existence. Radio communication methods for use in this radio communication network are roughly classified into a centralized control type communication method in which a radio communication terminal (which will hereinafter be referred to as a radio communication terminal accommodating apparatus), designed to carry out communication management, exists for giving communication rights to each of radio communication terminals and a distributed control type communication method in which no radio communication terminal accommodating apparatus for communication management among other radio communication terminals exists and each radio communication terminal carries out the confirmation of communication situations (carrier sense) in a radio transmission medium (hereinafter referred to as a transmission medium) for preventing a loss stemming from the occurrence of transmitted data collision so that access is made to the transmission medium when the transmission medium is in a vacant state.

In the case of the distributed control type communication method, each radio communication terminal carries out the carrier sense before conducting transmission, and starts transmission after confirming the fact that a transmission medium is in a vacant state (no radio signal exists on the transmission medium). FIG. 13 is an illustration of one example of a conventional distributed control configuration for a radio communication system, and FIG. 14 is a time chart showing one example of communication to be made in the radio communication system shown in FIG. 13. In FIG. 13, a radio communication system including four radio communication terminals 1001 to 1004 is shown as one example. These radio communication terminals 1001 to 1004 are on equal status and, as indicated by arrows, the transmission/reception of data can be made directly between all the radio communication terminals 1001 to 1004.

For example, in a case in which data is transmitted from the radio communication terminal 1001 to the radio communication terminal 1004, the radio communication terminal 1001 first confirms a communication situation of a transmission medium through the use of carrier sense and carries out the data transmission after a predetermined time $T_D$+ random time $T_{R1}$ elapses from the time at which a signal disappears in the transmission medium. For example, in a period of time 1111 of this transmission operation, a series of operations are conducted as follows. In this connection, during the transmission operation time period 1111, through the use of the carrier sense, each of the other radio communication terminals 1002 and 1003 detects a signal transmitted from the radio communication terminal 1001 to the transmission medium, thereby carrying out the setting so as to inhibit a transmission operation using this transmission medium.

First of all, the radio communication terminal 1001 transmits a transmission request signal indicative of a transmission request to the reception side radio communication terminal 1004. Upon receipt of the transmission request signal, the radio communication terminal 1004 transmits a transmission permission signal indicative of a transmission permission as a reply to the transmission request signal to the transmission side radio communication terminal 1001 and makes a notification on the fact that the preparation for the data reception reaches completion. Upon receipt of this transmission permission signal, the transmission side radio communication terminal 1001 transmits a signal (data signal) on data to the reception side radio communication terminal 1004 while, after the reception of this data, the reception side radio communication terminal 1004 transmits an acknowledgment signal representative of "reception was correctly made" or "reception was not correctly made" to the transmission side radio communication terminal 1001 while, upon receipt of this acknowledgment signal, the transmission side radio communication terminal 1001 terminates a series of operations related to the data transmission from the radio communication terminal 1001 to the radio communication terminal 1004. In this connection, within the transmission operation time period, when the radio communication terminals 1001 to 1004 start the signal transmission, after waiting for a predetermined time $T_s$ (<$T_D$), they conduct the signal transmission. Accordingly, for example, the predetermined time $T_s$ lies between the transmission request signal and the transmission permission signal, between the transmission permission signal and the data signal and between the data signal and the acknowledgment signal.

In addition, in a case in which a plurality of radio communication terminals 1001 to 1004 simultaneously conduct transmissions on the transmission medium, a contention (sometimes referred to equally as collision) occurs for the use of the transmission medium. For avoiding such a contention, at the start of the transmission operation, the radio communication terminals 1001 to 1004 carry out the carrier sense to confirm the fact that the transmission medium is in a vacant state, and each radio communication terminal waits for a random time, thereby avoiding a situation in which, for example, a contention repeatedly occurs between the radio communication terminals so as to make the communication substantially impossible.

For example, in a case in which the radio communication terminal 1002 and the radio communication terminal 1003 try to make data transmissions after the transmission operation time period 1111 for the radio communication terminal 1001, after the transmission operation time period 1111 elapses, the radio communication terminal 1002 tries to conduct a data transmission operation after waiting for a predetermined time $T_D$+ random time $T_{R2}$, while the radio communication terminal 1003 tries to conduct a data transmission operation after a predetermined time $T_D$+ random time $T_{R3}$. In this case, when $T_{R2}$<$T_{R3}$, the radio communication terminal 1002 first starts the signal transmission and, on the other hand, the radio communication terminal 1003 detects the start of the transmission by the radio communication terminal 1002 through the carrier sense while waiting for its own transmission time, and puts off the transmission. Moreover, the data transmission operation can be conducted after waiting for a predetermined time $T_D+(T_{R3}-T_{R2})$ from when a transmission operation time period 1112 for the radio communication terminal 1002 comes to an end or elapses. That is, after the end of the predetermined time $T_D+(T_{R3}-T_{R2}$ from when a transmission operation time period 1112 comes to an end, a transmission operation time period 1113 starts wherein the radio communication terminal 1003 conducts the data transmission.

In addition, a communication method supporting QoS (Quality of Service), data to be transmitted/received requires, becomes realizable in a manner such that the predetermined time $T_D$ or random time $T_R$, serving as a transmission stand-by time, is set at a different value for each type of QoS according to QoS or it is determined through a different algorithm.

On the other hand, in the case of the centralized control type communication method, each radio communication terminal carries out communications with respect to only a radio communication terminal accommodating apparatus and only a radio communication terminal permitted in communication by the radio communication terminal accommodating apparatus can carry out the communications. FIG. 15 is an illustration of one example of a conventional centralized control configuration in a radio communication system, and FIG. 16 is a time chart showing a first example of communication to be conducted in the radio communication system shown in FIG. 15. In FIG. 15, as one example, there is shown a radio communication system including a radio communication terminal accommodating apparatus 1201 and three radio communication terminals 1202 to 1204. As indicated by arrows in FIG. 15, the respective radio communication terminals 1202 to 1204 can make communications with respect to only a radio communication terminal accommodating apparatus 1201.

The radio communication terminal accommodating apparatus 1201 almost periodically transmits an index signal (beacon signal) 1311 for setting a time period for which the radio communication terminal accommodating apparatus 1201 executes centralized control. The radio communication terminal accommodating apparatus 1201 can transmits a signal to a transmission medium after a predetermined time $T_p$ from when signal disappears in the transmission medium, and it can acquire access to the transmission medium with priority to the predetermined time $T_D$ ($>T_p$) for which the radio communication terminals 1202 to 1204 need to wait.

This index signal 1311 enables all the radio communication terminals 1202 to 1204 to carry out a data transmission operation only when receiving a communication permission from the radio communication terminal accommodating apparatus 1201. When the aforesaid predetermined time starts, the radio communication terminal accommodating apparatus 1201 transmits a polling signal (Poll) 1312 to make a notification for selecting a desired radio communication terminal (for example, the radio communication terminal 1202) as a communication partner. At this time, a data signal 1313 to be transmitted can also be transmitted in succession. Upon receipt of the polling signal 1312+ the data signal 1313, the radio communication terminal 1202 transmits a polling reception acknowledgment signal (Poll acknowledgment) 1314 for making a notification on the reception completion after a predetermined time $T_s$ ($<T_p$). In this connection, the radio communication terminal 1202 can also transmit a data signal 1315 subsequently to the polling reception acknowledgment signal 1314.

After the completion of the transmission by the radio communication terminal 1202, the radio communication terminal accommodating apparatus 1201 can also produce and transmit an acknowledgment signal 1316 for the notification on the completion of reception of the data signal 1315+a polling signal (Poll) 1317 to a different radio communication terminal (for example, the radio communication terminal 1203) after waiting for the predetermined time $T_s$. In a case in which the radio communication terminal 1203 does not return the polling reception acknowledgment signal 1314 to the radio communication terminal accommodating apparatus 1201 for some reason, the radio communication terminal accommodating apparatus 1201 can also transmit a polling signal (Poll) 1318 to a different radio communication terminal (for example, the radio communication terminal 1204) after a predetermined time $T_p$. Moreover, when the radio communication terminal accommodating apparatus 1201 transmits an end signal 1319, this centralized control type communication method comes to an end.

Furthermore, FIG. 17 is a time chart showing a second example of communication to be conducted in the radio communication system shown in FIG. 15. The radio communication terminal accommodating apparatus 1201 can select one of the radio communication terminals 1202 to 1204 after a predetermined time $T_p$ from when signal disappears in the transmission medium to transmit a polling signal (Poll) 1411 thereto. This polling signal 1411 makes the setting so as to inhibit the other radio communication terminals 1202 to 1204 from making communications. A transmission-allowable time period 1412 for which only a radio communication terminal to which a transmission right is given through the polling signal 1411 can make data transmission is set after the elapse of a predetermined time $T_s$ from the completion of the transmission of this polling signal 1411. This transmission-allowable time period 1412 runs on from when the polling signal 1411 is transmitted until a predetermined time period elapses or until an end signal 1319 is transmitted by the radio communication terminal accommodating apparatus 1201.

In this connection, the radio communication terminal accommodating apparatus 1201 can transmit this polling signal 1411 at any time when a predetermined time $T_p$ elapses after an arbitrary signal disappears in the transmission medium, and the predetermined time $T_p$ is set at a time period shorter than the predetermined time $T_D$ forming a stand-by time of the radio communication terminals 1202 to 1204. Moreover, it is possible to select this radio communication terminal accommodating apparatus 1201 itself through the polling signal 1411 and, since the communication mode is not limited in the transmission-allowable time period 1412 (that is, it is also possible to transmit a polling signal for again selecting the radio communication terminal accommodating apparatus 1201 itself in the transmission-allowable time period 1412), the radio communication terminal accommodating apparatus 1201 has an extremely strong access right to the transmission medium.

Furthermore, FIG. 18 is an illustrative view showing one example of communication based on a combination of conventional distributed control type and centralized control type communication methods. As shown in FIG. 18, the aforesaid distributed control type and centralized control type communication methods are used in a state combined with each other. For example, in a radio communication system having the radio communication terminal accommodating apparatus 1201 shown in FIG. 15, the distributed control type communication method and the communication method of the first example of the centralized control type are almost periodically conducted alternately under control of the radio communication terminal accommodating apparatus 1201, and the radio communication terminal accommodating apparatus 1201 can start the communication method of the second example of the centralized control type.

However, the conventional radio communication methods are mainly for the purpose of avoiding the contention between radio communication terminals and the collision between signals and, hence, the overheads (for example, transmission of polling signals for each radio communication terminal) on communications other than data, such as guard times (for example, the aforesaid predetermined times $T_s$, $T_p$, $T_D$ and others) and control signals, are provided between signals to be transmitted from each radio communication terminal or a radio communication terminal accommodating apparatus to a radio transmission medium. The data communication time becomes shorter as the communication time for the guard times and the overheads becomes longer, thereby leading to a decrease in throughput, which produces a great factor of a decrease in throughput of data communications. In this case, the throughput signifies an average data transmission volume per unit time which is to be correctly transmitted/received through a radio communication medium between transceivers and, usually, it is expressed by an average number of bits [bit/second] correctly transmitted per second.

DISCLOSURE OF THE INVENTION

In consideration of the above-described problems, it is an object of the present invention to provide a radio communication method and radio communication terminal accommodating apparatus capable of improving the communication throughput while maintaining the interchangeability with a radio communication system or radio communication method employing a time division multiple access (TDMA) using carrier sense in a conventional multiple access system.

For achieving the above-mentioned purpose, a radio communication method according to the present invention for use in a radio communication system, designed to make communications between one radio communication terminal accommodating apparatus and a plurality of radio communication terminals, communication-controlled by the radio communication terminal accommodating apparatus, through a radio transmission medium, wherein the radio communication terminal accommodating apparatus determines the allocation order of communication right permitting occupation of the radio transmission medium with respect to each of the plurality of radio communication terminals, and the radio communication terminal accommodating apparatus monitors a communication on the radio transmission medium and transmits information on the determined allocation order of the communication right collectively to the plurality of radio communication terminals at an arbitrary timing of a detection of a non-signal time longer than a predetermined length in communication on the radio transmission medium so that, on the basis of the information on the order, each of the plurality of radio communication terminals acquires the communication right to use the radio transmission medium and makes communication.

Thus, the radio communication terminal accommodating apparatus can determine the given order of the communication rights with respect to the respective radio communication terminals and can transmit the information indicative of this order at an arbitrary transmission timing acquired through the carrier sense, which optimizes the time interval of the communication right time periods adjacent to each other so that the communication throughput is improvable.

In addition, for the aforesaid purpose, a radio communication method according to the present invention for use in a radio communication system, designed to make communications between one radio communication terminal accommodating apparatus and a plurality of radio communication terminals, communication-controlled by the radio communication terminal accommodating apparatus, through a radio transmission medium, wherein the radio communication terminal accommodating apparatus determines a time zone to be allocated as the communication right permitting occupation of the radio transmission medium with respect to each of the plurality of radio communication terminals, and the radio communication terminal accommodating apparatus determines the allocation order of communication right permitting occupation of the radio transmission medium with respect to each of the plurality of radio communication terminals, and the radio communication terminal accommodating apparatus monitors a communication on the radio transmission medium and transmits information on the time zone and the order collectively to the plurality of radio communication terminals at an arbitrary timing of a detection of a non-signal time longer than a predetermined length in communication on the radio transmission medium so that, on the basis of the information on the time zone, each of the plurality of radio communication terminals acquires the communication right to use the radio transmission medium and makes communication and subsequently, on the basis of the information on the order, acquires the communication right to use the radio transmission medium and makes communication.

Thus, the radio communication terminal accommodating apparatus can determine the time zones to be given as the communication rights with respect to the respective radio communication terminals and can transmit the information indicative of this time zone at an arbitrary transmission timing acquired through the carrier sense, which optimizes the time interval of the communication right time periods adjacent to each other so that the communication throughput is improvable. Moreover, the radio communication terminal accommodating apparatus can determine the given order of the communication rights subsequently to the setting of the communication rights based on the time zone and can transmit the information indicative of this order at an arbitrary transmission timing acquired through the carrier sense, which optimizes the time interval of the communication right time periods adjacent to each other so that the communication throughput is improvable.

Still additionally, in accordance with the present invention, the radio communication terminal accommodating apparatus determines a direction of communication between the radio communication terminal accommodating apparatus and the radio communication terminals with respect to the communication rights allocated as the time zones and transmits information on the communication direction in addition to the information on the time zones and the order collectively to the plurality of radio communication terminals, while each of the plurality of radio communication terminals makes communication according to the communication direction when making communication according to the communication right allocated as the time zone.

For example, this can reduce a redundant stand-by time for a communication right time period related to the downlink from the radio communication terminal accommodating apparatus to each of the radio communication terminals, thereby improving the communication throughput.

Yet additionally, according to the present invention, further to the above-described invention, when starting the communication by the communication right allocated as the order, the radio communication terminal monitors the communication by the radio communication terminal having the allocated turn immediately preceding the turn of this radio communication terminal and, when detecting a non-signal time longer than a predetermined length in the communication by the radio communication terminal having the immediately-preceding allocated turn, decides the incoming of its own communication right time period and starts the communication by the communication right.

This enables smooth and reliable shifting or transition to the communication right time period determined in order.

Moreover, according to the present invention, further to the above-described invention, the radio communication terminal transmits information indicative of the completion of the communication by the communication right when terminating the communication by the communication right allocated as the order.

This enables a clear pronouncement on the end of the communication right with respect to the radio communication terminal accommodating apparatus and the other radio communication terminals, thereby achieving the smooth and reliable shifting among the communication rights.

Still moreover, according to the present invention, further to the above-described invention, the radio communication terminal monitors the communication by the radio communication terminal having the allocated turn immediately preceding the turn of this radio communication terminal and, when detecting that the information indicative of the completion of the communication is transmitted from the radio communication terminal having the immediately-preceding allocated turn, decides the incoming of its own communication right time period and starts the communication by the communication right.

This enables smooth and reliable shifting to the communication right time period determined in order.

Yet moreover, according to the present invention, further to the above-described invention, the radio communication terminal accommodating apparatus is made to carry out the order allocation such that, of the communication rights allocated as the order, with respect to the communication rights having the turns adjacent to each other, the radio communication terminal having the succeeding allocated turn monitors the communication by the radio communication terminal having the preceding allocated turn.

This enables smooth and reliable shifting to the communication right time period determined in order.

Yet moreover, according to the present invention, combined with the above-described invention, each of the plurality of radio communication tee annals acquires identification information on the communication-monitorable other radio communication terminal, and each of the plurality of radio communication terminals transmits the identification information on the other radio communication terminal, acquired through the monitoring, to the radio communication terminal accommodating apparatus, while the radio communication terminal accommodating apparatus carries out the order allocation on the basis of the identification information on the other radio communication terminal received from each of the plurality of radio communication terminals.

Thus, the radio communication terminal accommodating apparatus can determine the order so as to enable the smooth and reliable shifting between the communication right time periods.

Furthermore, for the above-mentioned purpose, a radio communication method according to the present invention for use in a radio communication system, designed to make communications between one radio communication terminal accommodating apparatus and a plurality of radio communication terminals, communication-controlled by the radio communication terminal accommodating apparatus, through a radio transmission medium, wherein the radio communication terminal accommodating apparatus determines a time zone to be allocated as communication right permitting occupation of the radio transmission medium with respect to each of the plurality of radio communication terminals, and the radio communication terminal accommodating apparatus monitors a communication on the radio transmission medium and transmits information on the time zone collectively to the plurality of radio communication terminals at an arbitrary timing of a detection of a non-signal time longer than a predetermined length in communication on the radio transmission medium so that, on the basis of the information on the time zone, each of the plurality of radio communication terminals acquires the communication right to use the radio transmission medium.

Thus, the radio communication terminal accommodating apparatus can deter nine the time zones corresponding to the communication rights given with respect to the respective radio communication terminals and can transmit the information indicative of this time zone at an arbitrary transmission timing acquired through the carrier sense, which optimizes the time interval of the communication right time periods adjacent to each other so that the communication throughput is improvable.

Still furthermore, according to the present invention, combined with the above-described invention, the radio communication terminal accommodating apparatus determines a communication direction between the radio communication terminal accommodating apparatus and the radio communication terminals with respect to the communication rights allocated as the time zones and transmits the information on the communication direction in addition to the information on the time zone collectively to the plurality of radio communication terminals so that each of the plurality of radio communication terminals makes the communication according to the communication direction when making the communication by the communication right allocated as the time zone.

For example, this can reduce a redundant stand-by time for a communication right time period related to the downlink from the radio communication terminal accommodating apparatus to each of the radio communication terminals, thereby improving the communication throughput.

Yet furthermore, according to the present invention, combined with the above-described invention, when the communications by all the communication rights allocated to the plurality of radio communication terminals by the radio communication terminal accommodating apparatus reach completion, the communication mode in the radio transmission medium is returned to a communication mode before the allocation of the communication rights by the radio communication terminal accommodating apparatus.

This can maintain the interchangeability with a radio communication system or radio communication method using carrier sense in a conventional multiple access system.

In addition, for the aforesaid purpose, a radio communication terminal accommodating apparatus according to the present invention, designed to make communications with respect to each of a plurality of radio communication terminals through a radio transmission medium and to carry out communication control in each of the plurality of radio communication terminals, comprises means for determining the allocation order of communication right permitting the occupation of the radio transmission medium with respect to each of the plurality of radio transmission terminals and means for monitoring communication in the radio transmission medium to transmit information on the order collectively to the plurality of radio communication terminals at an arbitrary timing of a detection of a non-signal time longer than a predetermined length on the communication in the radio transmission medium, with each of the plurality of radio communication terminals being made to acquire communication right to use the radio transmission medium on the basis of the information on the order for carrying out communication.

This configuration enables the radio communication terminal accommodating apparatus to determine the order of the communication right to be given to each radio communication terminal and transmit the information on this order at an arbitrary transmission timing acquired through the carrier sense, which optimizes the time interval between the adjoining communication right time periods to improve the communication throughput.

Still additionally, for the aforesaid purpose, a radio communication terminal accommodating apparatus according to the present invention, designed to make communications with respect to each of a plurality of radio communication terminals through a radio transmission medium and to carry out communication control in each of the plurality of radio communication terminals, comprises means for determining a time zone to be allocated as a communication right permitting the occupation of the radio transmission medium with respect to each of the plurality of radio transmission terminals, means for determining an allocation order of communication right permitting the occupation of the radio transmission medium with respect to each of the plurality of radio transmission terminals and means for monitoring communication in the radio transmission medium to transmit information on the time zone and the order collectively to the plurality of radio communication terminals at an arbitrary timing of a detection of a non-signal time longer than a predetermined length on the communication in the radio transmission medium, with each of the plurality of radio communication terminals being made to acquire communication right to use the radio transmission medium on the basis of the information on the time zone for carrying out communication and subsequently to acquire communication right to use the radio transmission medium on the basis of the information on the order for carrying out communication.

This configuration enables the radio communication terminal accommodating apparatus to determine the time zone of the communication right to be given to each radio communication terminal to transmit the information on this time zone at an arbitrary transmission timing acquired through the carrier sense, which optimizes the time interval between the adjoining communication right time periods to improve the communication throughput. Moreover, it enables the radio communication terminal accommodating apparatus to determine the order of the communication right to be given thereto subsequently to the setting of the communication right on the time zone to transmit the information on this order at an arbitrary transmission timing acquired through the carrier sense, which optimizes the time interval between the adjoining communication right time periods to improve the communication throughput.

Yet additionally, for the aforesaid purpose, a radio communication terminal accommodating apparatus according to the present invention, designed to make communications with respect to each of a plurality of radio communication terminals through a radio transmission medium and to carry out communication control in each of the plurality of radio communication terminals, comprises means for determining the time zone to be allocated as the communication right permitting the occupation of the radio transmission medium with respect to each of the plurality of radio transmission terminals and means for monitoring communication in the radio transmission medium to transmit information on the time zone collectively to the plurality of radio communication terminals at an arbitrary timing of a detection of a non-signal time longer than a predetermined length on the communication in the radio transmission medium, with each of the plurality of radio communication terminals being made to acquire communication right to use the radio transmission medium on the basis of the information on the time zone for carrying out communication.

This configuration enables the radio communication terminal accommodating apparatus to determine the time zone of the communication right to be given to each radio communication terminal and transmit the information on this time zone at an arbitrary transmission timing acquired through the carrier sense, which optimizes the time interval between the adjoining communication right time periods to improve the communication throughput.

In accordance with the present invention, the radio communication terminal accommodating apparatus determines the allocation order of communication right permitting the occupation of the radio transmission medium with respect to each of the plurality of radio transmission terminals and monitors communication in the radio transmission medium to transmit information on the order collectively to the plurality of radio communication terminals at an arbitrary timing of a detection of a non-signal time longer than a predetermined length on the communication in the radio transmission medium, with each of the plurality of radio communication terminals being made to acquire communication right to use the radio transmission medium on the basis of the information on the order for carrying out communication, which enables the radio communication terminal accommodating apparatus to determine the given order of communication right to each radio communication terminal for transmitting the information on this order at an arbitrary transmission timing acquired through the carrier sense, thus optimizing the time interval between the adjoining communication right time periods to improve the communication throughput.

Moreover, in accordance with the present invention, the radio communication terminal accommodating apparatus determines the time zone allocated as the communication right permitting the occupation of the radio transmission medium with respect to each of the plurality of radio transmission terminals and monitors communication in the radio transmission medium to transmit information on the time zone collectively to the plurality of radio communication terminals at an arbitrary timing of a detection of a non-signal time longer than a predetermined length on the communication in the radio transmission medium, with each of the plurality of radio communication terminals being made to acquire communication right to use the radio transmission medium on the basis of the information on the time zone for carrying out communication, which enables the radio communication terminal accommodating apparatus to determine the time zone to be given as communication right to each radio communication terminal for transmitting the information on this time zone at an arbitrary transmission timing acquired through the carrier sense, thus optimizing the time interval between the adjoining communication right time periods to improve the communication throughput.

Still moreover, in accordance with the present invention, a radio communication terminal accommodating apparatus determines a time zone to be allocated as a communication right permitting the occupation of the radio transmission medium with respect to each of the plurality of radio transmission terminals, determines an allocation order of communication right permitting the occupation of the radio transmission medium with respect to each of the plurality of radio transmission terminals and monitors communication in the radio transmission medium to transmit information on the time zone and the order collectively to the plurality of radio communication terminals at an arbitrary timing of a detection of a non-signal time longer than a predetermined length on the communication in the radio transmission medium, with each of the plurality of radio communication terminals being made to acquire communication right to use the radio transmission medium on the basis of the information on the time zone for carrying out communication and subsequently to acquire communication right to use the radio transmission medium on the basis of the information on the order, which enables the radio communication terminal accommodating apparatus to determine the time zone to be given as communication right to each radio communication terminal for transmitting the information on this time zone at an arbitrary transmission timing acquired through the carrier sense, thus optimizing the time interval between the adjoining communication right time periods to improve the communication throughput, and which enables the radio communication terminal accommodating apparatus to determine the order of the communication right to be given thereto subsequently to the setting of the communication right on the time zone to transmit the information on this order at an arbitrary transmission timing acquired through the carrier sense, thereby optimizing the time interval between the adjoining communication right time periods to improve the communication throughput.

BEST MODE FOR CARRYING OUT THE INVENTION

Figure 1:
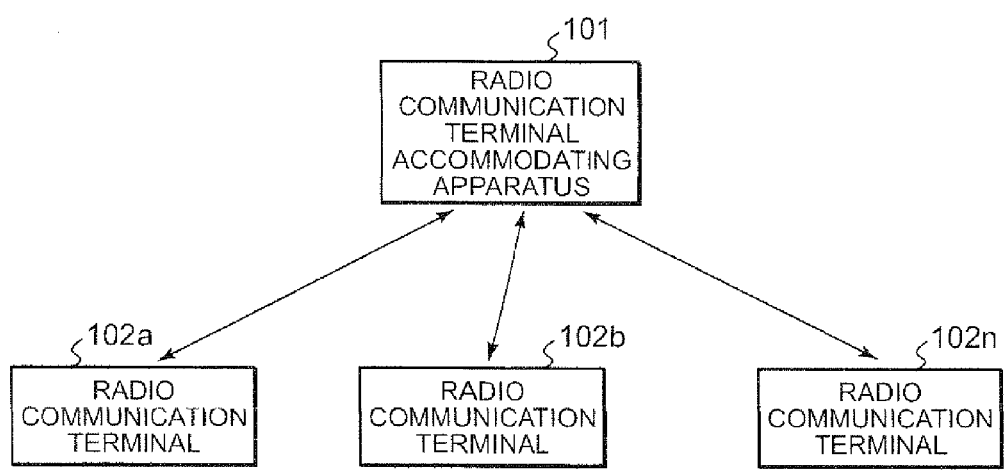
FIG. 1 is an illustration of a configuration of a radio communication system common to first to third embodiments of the present invention.

First to third embodiments of the present invention will be described hereinbelow with reference to the drawings. FIG. 1 is an illustration of a radio communication system common to first to third embodiments of the present invention. As FIG. 1 shows, a radio communication system according to the present invention is of a centralized control type made up of one radio communication terminal accommodating apparatus 101 and a plurality of radio communication terminals accommodated by the radio communication terminal accommodating apparatus 101. Incidentally, the following description will be given assuming that n radio communication terminals 102a to 102n reside in the radio communication system shown in FIG. 1.

Figure 2:
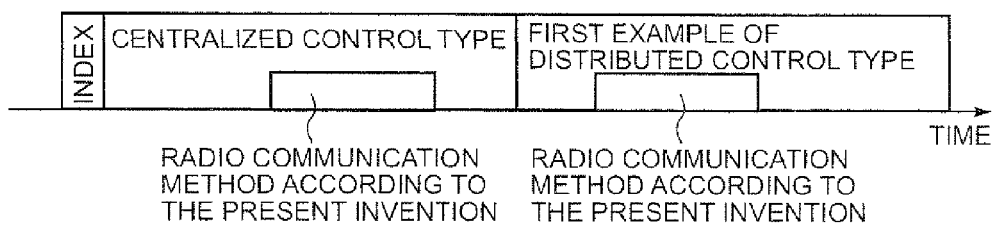
FIG. 2 is an illustrative view showing the outline of a communication common to the first to third embodiments of the present invention.

Moreover, FIG. 2 is an illustrative view showing the outline of a communication common to the first to third embodiments of the present invention. In a radio communication method according to the present invention, in a communication mode in which a conventional distributed control type communication method and a conventional centralized control type communication method described as the first example are almost periodically and alternately conducted under control of the radio communication terminal accommodating apparatus 101, the radio communication terminal accommodating apparatus 101 can start to work at any time as needed. In this respect, this can be considered to be on an equivalent status to the conventional centralized control type communication method described as the second example.

Figure 3:
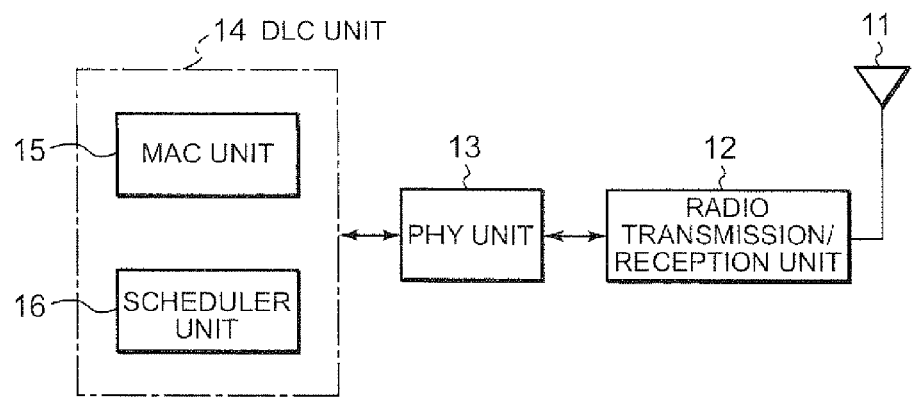
FIG. 3 is a block diagram showing a configuration of a radio communication terminal accommodating apparatus common to the first to third embodiments of the present invention.

Still moreover, FIG. 3 is a block diagram showing a configuration of a radio communication terminal accommodating apparatus common to the first to third embodiments of the present invention. The radio communication terminal accommodating apparatus 101 shown in FIG. 3 is composed of an antenna 11, a radio transmission/reception unit 12, a PHY (Physical Layer) unit 13, a DLC (Data Link Control) unit 14, an MAC (Media Access Control) unit 15 and a scheduler unit 16. The radio transmission/reception unit 12 carries out a signal conversion to transmit a signal, received from the PHY unit 13, as a radio signal through the antenna 11, and makes a conversion on a radio signal received through the antenna 11 and outputs it to the PHY unit 13. The PHY unit 13 makes a mutual conversion between data to be transmitted/received and a signal corresponding to a radio transmission medium. The DLC unit 14 carries out data transmission control, and the MAC unit 15 constitutes a portion of the DLC unit 14 and performs data sending control.

Moreover, the scheduler unit 16 allocates communication rights with respect to the radio communication terminals 102a to 102n. Concretely, for example, with respect to each of the plurality of radio communication terminals 102a to 102n, the scheduler unit 16 determines the order or turn of the allocation of the communication right (first embodiment described later), determines a time zone to be allocated as the communication right (second embodiment described later) or determines both the aforesaid communication right allocation order and time zone, and produces a multiple-polling signal representative of the allocation of the communication right and carries out control on a transmission timing of data to be transmitted.

First Embodiment

Figure 4:
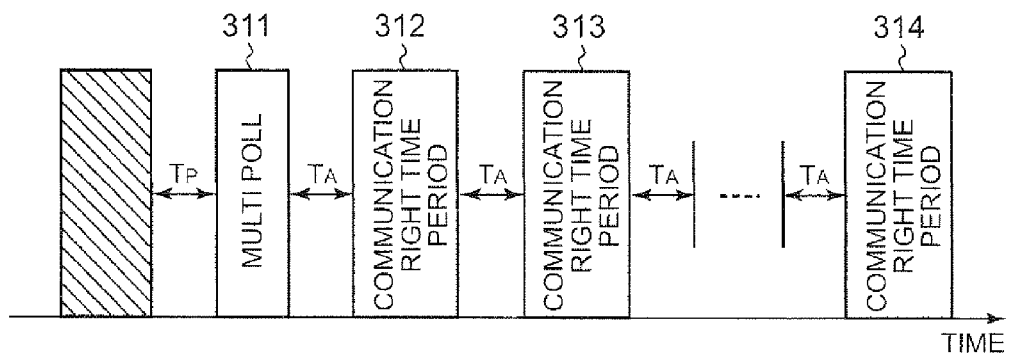
FIG. 4 is a time chart showing a communication according to the first embodiment of the present invention.

A description will be given hereinbelow of a first embodiment of the present invention. FIG. 4 is a time chart showing a communication according to the first embodiment of the present invention. First of all, the radio communication terminal accommodating apparatus 101 carries out carrier sense on a communication situation of a transmission medium and, after waiting for only a predetermined carrier sense time $T_p$ from a point of time that signal disappears in the transmission medium, transmits a multiple-polling signal (MultiPoll) 311 to the transmission medium. The transmission of this multiple-polling signal 311 is conducted by means of the broadcast to the respective radio communication terminals 102a to 102n, and all radio comma communication terminals 102a to 102n accommodated in the radio communication terminal accommodating apparatus 101 can receive the multiple-polling signal 311 to refer to it.

In this multiple-polling signal 311, there is written the order of communication rights to be given to each of the radio communication terminals 102a to 102n. That is, in the multiple-polling signal 311, there is written the order of the communication rights to be given thereto, such as "radio communication terminal 102a", "radio communication terminal 102b", . . . , "radio communication terminal 102n". In this connection, as an identifier of the "radio communication terminal 102a" which specifies the radio communication terminal 102a, it is possible to use, for example, an MAC-ID determined globally and uniquely, an connection ID set at connection, or the like, and it is desirable that the radio communication terminal accommodating apparatus 101 acquires or sets these identifiers in advance.

As methods of allocating a communication right to each of the radio communication terminals 102a to 102n in the radio communication terminal accommodating apparatus 101, for example, there are a method of allocating communication rights selectively to the radio communication terminals 102a to 102n which make a request for data transmission and a method of allocating the communication rights to all the radio communication terminals 102a to 102n. Moreover, as well as the respective radio communication terminals 102a to 102n, a communication right can also be allocated through the multiple-polling signal 311 to even the radio communication terminal accommodating apparatus 101 itself.

In the case of the method of allocating the communication rights selectively to the radio communication terminals 102a to 102n which make a request for data transmission, before the transmission of the multiple-polling signal 311, the radio communication terminal accommodating apparatus 101 collects the data transmission requests from the respective radio communication terminals 102a to 102n and gives a communication right to only the radio communication terminals 102a to 102n which have made a request for the data transmission. At this time, for example, in a case in which the radio communication terminals 102a to 102n, which have made the data transmission request, are many in number, the radio communication terminal accommodating apparatus 101 can also limit the radio communication terminals 102a to 102n to which the communication rights are to be given. In the case of this method, in the multiple-polling signal 311, there is written only the identification information on the radio communication terminals 102a to 102n which make a data transmission request.

On the other hand, in the case of the method of allocating the communication rights to all the radio communication terminals 102a to 102n, the radio communication terminal accommodating apparatus 101 produces a multiple-polling signal in which written are the identification information of the radio communication terminals 102a to 102n accommodated. Moreover, the radio communication terminal accommodating apparatus 101 can also use the above-described two methods properly or combine them in accordance with the number of radio communication terminals 102a to 102n to be accommodated or the number of radio communication terminals 102a to 102n which make a request for the data transmission. Still moreover, if the radio communication terminals to be accommodated are many in number, then the allocation of the communication rights can also be made by a plurality of divided multiple-polling signals 311 such that the first multiple-polling signal 311 conducts the allocation of the communication rights on the radio communication terminals 102a to 102f while the next multiple-polling signal 311 performs the allocation of the communication rights on the radio communication terminals 102g to 102n.

After the completion of transmission of the multiple-polling signal 311, the communications are made according to the communication rights of the respective radio communication terminals 102a to 102n allocated through the use of the multiple-polling signal 311. That is, after the completion of transmission of the multiple-polling signal 311, a communication right time period 312 for the radio communication terminal 102a starts after leaving out a predetermined time $T_A$ ($<T_p$) sufficiently shorter than a conventional guard time. Incidentally, since the next-transmission-permitted radio communication terminal 102a is already determined by the multiple-polling signal 311, a predetermined time period shorter than the conventional predetermined time $T_s$ is also employable as the time $T_A$. Within this communication right time period 312, of the n radio communication terminals 102a to 102n, only the radio communication terminal 102a is permitted on the transmission medium, while the other non-permitted radio communication terminals 102b to 102n other than the radio communication terminal 102a cannot conduct the transmission operations using this transmission medium.

In addition, the radio communication terminal accommodating apparatus 101 does not determine the length of the communication right time period 312, and the communication right time period 312 for the radio communication terminal 102a continues until the data transmission from the radio communication terminal 102a reaches completion. Still additionally, within the communication right time period 312, it is preferable that the radio communication terminal 102a uses a predetermined time $T_B$ shorter than the aforesaid $T_A$. As this predetermined time $T_B$, for example, the shortest guard time (time needed for the switching from reception to transmission) is employable. The radio communication terminal 102b to which the turn of the communication right time period is allocated next to the radio communication terminal 102a, which is making a communication using the communication right time period 312, monitors the communication between the radio communication terminal accommodating apparatus 101 and the radio communication terminal 102a and, when the radio transmission medium has been in a non-signal state for the predetermined time $T_A$ ($>T_B$, $<T_p$) from the last point of time that a signal existed in the transmission medium, starts the data transmission, and the shifting or transition occurs from the communication right time period 312 for the radio communication terminal 102a to a communication right time period 313 for the radio communication terminal 102b. Incidentally, in this case, although the radio communication terminal 102b to which the communication right is given next to the radio communication terminal 102a carries out the carrier sense to detect the timing of the shifting of the communication right, for example, it is also acceptable to make clear the timing of the shifting of the communication right by including a bit indicative of the end of the communication right time period or a spontaneous release in acknowledgment signal 412, acknowledgment signals 422a to 422c, mentioned later, the last packet when the transmission reaches completion, or the like.

Furthermore, the radio communication terminals 102a to 102n which does not require the communication rights determined through the use of the multiple-polling signal 311 (for example, the radio communication terminals 102a to 102n which cancel the data transmission after making a request for the data transmission or the radio communication terminals 102a to 102n having no intention of carrying out the data but receiving the allocation of the communication rights) need to transmit some signal for using the communication right. At this time, the signal to be transmitted from each of the radio communication terminals 102a to 102n which does not require the communication rights can be an arbitrary signal. In a case in which a non-signal time period longer than the predetermined time $T_p$ occurs on the transmission medium, since there is a possibility that the communication is made without obeying the order set through the multiple-polling signal 311, there is a need to prevent the aforesaid occurrence of a non-signal time period longer than the predetermined time $T_p$.

When the shifting from the communication right time periods 312 and 313 takes place according to the order set through the multiple-polling signal 311 in this way and a communication right time period 314 for the radio communication terminal 102n having the last turn comes to an end, the radio communication system again returns to the distributed control type communication method. In this connection, for example, in a case in which a maximum communication right time period is set for each of the radio communication terminals 102a to 102n so that the shifting to the communication right time period for the radio communication terminal 102a to 102n corresponding to the next turn is made when that time period elapses or when the radio communication terminal accommodating apparatus 101 transmits a forced termination signal, it is also possible to return the operation to the distributed control type communication method. Within the time period of carrying out the distributed control type communication method, a conventional radio communication terminal can also conduct the transmission and reception. Moreover, it is also possible to again transmit the next multiple-polling signal 311 without returning to the distributed control after the end of the communication right time period 314, thereby shifting to a communication method similar to that shown in FIG. 4.

In addition, in a manner such that the radio communication terminal accommodating apparatus 101 sets the last communication right time period, specified by the multiple-polling signal 311, in the radio communication terminal accommodating apparatus 101 itself and again transmits the multiple-polling signal 311 within this last communication right time period, it is possible to continue the communication mode specified by the multiple-polling signal 311.

Still additionally, in a case in which the lastly set communication right time period 314 for the radio communication terminal 102n comes to an end and the communication method again returns to the distributed control type, there is a case in which the radio communication terminal 102a to 102n which cannot detect the completion of the communication mode specified by the multiple-polling signal 311 (for example, a radio communication terminal which cannot detect the communication by the radio communication terminal 102n) exists, which leads to a radio communication system unfair in the radio communication terminals 102a to 102n.

For keeping the fairness among the radio communication terminals 102a to 102n, the communication may be made according to the following setting.

When detecting the end of the last communication right time period 314, the radio communication terminal accommodating apparatus 101 broadcasts an end notification signal indicative of the completion of this communication mode to all the radio communication terminals 102a to 102n.

In a case in which a power control (transmission power control) is implemented and a possibility exists that, of the radio communication terminals 102a to 102n, there is the radio communication terminal 102a to 102n on which the radio communication terminal accommodating apparatus 101 cannot detect the communication, the last communication right time period 314 is positively allocated to the radio communication terminal 102a to 102n detectable by the radio communication terminal accommodating apparatus 101 and, when detecting the end of the last communication right terminal 314, the radio communication terminal accommodating apparatus 101 broadcasts an end notification signal indicative of the completion of this communication mode to all the radio communication terminals 102a to 102n.

The last communication right time period 314 is set in the radio communication terminal accommodating apparatus 101 itself and, at the end of this communication right time period, an end notification signal indicative of the completion of this communication mode is broadcasted to all the radio communication terminals 102a to 102n.

A maximum continuation time for a communication mode specified by the multiple-polling signal 311 is set and, when this maximum continuation time elapses, the radio communication system is made to return to the distributed control type communication method.

Figure 5:
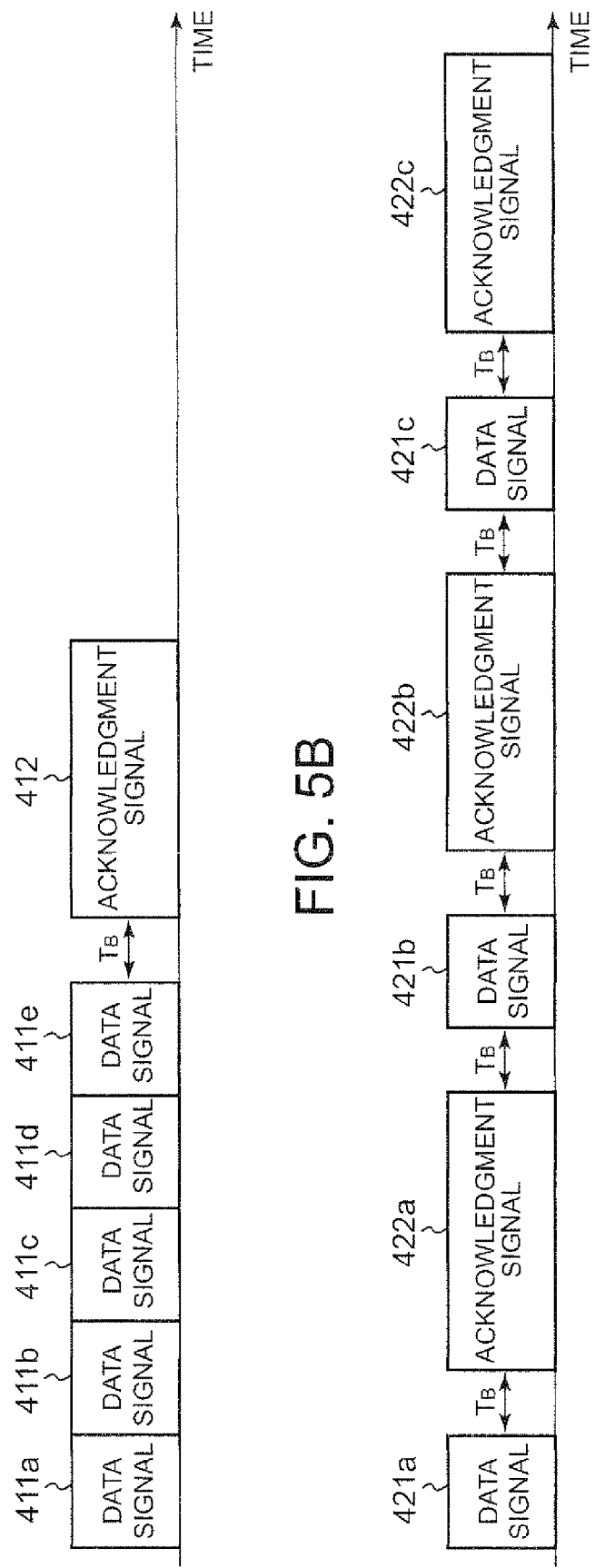
FIG. 5A is an illustration of a first example of a time chart showing a communication mode within a communication right time period according to the first embodiment of the present invention.
FIG. 5B is an illustration of a second example of a time chart showing a communication mode within a communication right time period according to the first embodiment of the present invention.

Furthermore, the radio communication terminals 102a to 102n, which conduct the communications using the communication right time periods 312 to 314 (the communication rights are allocated thereto) within these communication right time periods, can employ any communication mode. FIGS. 5A and 5B are time charts showing communication modes within communication right time periods according to the first embodiment of the present invention. For example, within the communication right time period 312, as shown in FIG. 5A, the radio communication terminal 102a transmits data signals 411a to 411e, to be sent, in succession to the radio communication terminal accommodating apparatus 101, and the radio communication terminal accommodating apparatus 101 can once transmit an acknowledgment signal 412 for the confirmation of these data signals 411a to 411e. In addition, as shown in FIG. 5B, the radio communication terminal accommodating apparatus 101 can also alternately transmit data signals 421a to 421c and acknowledgment signals 422a to 422c by one.

Preferably, a predetermined time $T_B$ ($<T_A$) is employed within each of the communication right time periods 312 to 314. Moreover, when data signals to be sent are transmitted in succession to the radio communication terminal accommodating apparatus 101, the redundancy predetermined time $T_B$ and the acknowledgment signals are reducible, so the communication efficiency is improvable. Still moreover, a communication forming a feature of the present invention after the transmission of the multiple-polling signal 311 utilizes the times $T_A$ and $T_B$ shorter than the predetermined time $T_p$ taken as a stand-by time between data so far. This inhibits a radio communication terminal accommodating apparatus or radio communication terminal in a conventional system from carrying out data transmissions. Yet moreover, for example, if it takes time until the turn comes or when the communication right allocated was already used, it is also possible that the radio communication terminals 102a to 102c fall into a power-saving mode to suppress the useless consumption of electric power.

Figure 6:
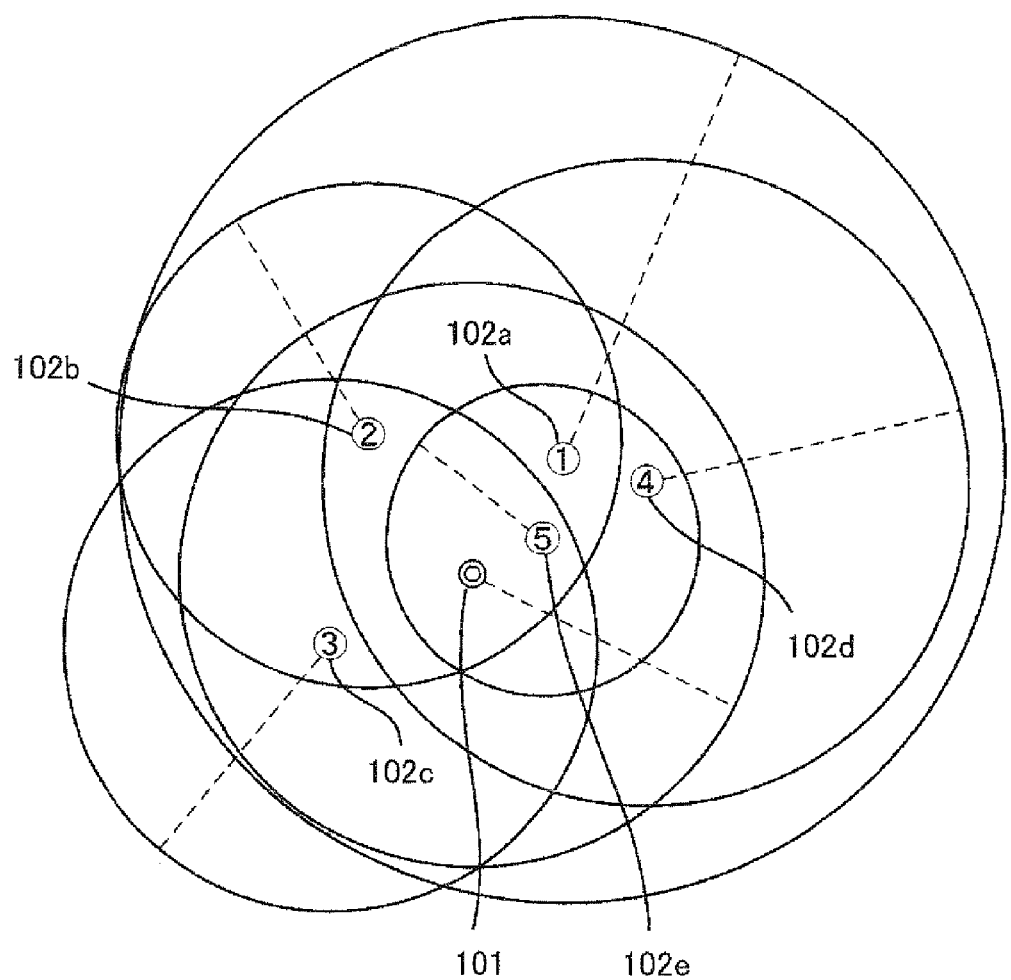
FIG. 6 is an illustrative view showing one example of a configuration of a radio communication system according to the first embodiment of the present invention.

In addition, with respect to the order of the respective radio communication terminals 102a to 102n to be set through the use of the multiple-polling signal 311, there is a need to make the setting carefully for the following reasons. FIG. 6 is an illustrative view showing one example of a configuration of a radio communication system according to the first embodiment of the present invention. For an easy understanding of the description, FIG. 6 shows a radio communication system made up of one radio communication terminal accommodating apparatus 101 and five radio communication terminals 102a to 102e, where a communication range is drawn illustratively. Moreover, the five radio communication terminals 102a to 102e are numbered by (1) to (5), respectively. In the illustration, the numbers (1) to (5) given to the radio communication terminals 102a to 102e are indicated in a state circled.

Figures 7, 8:
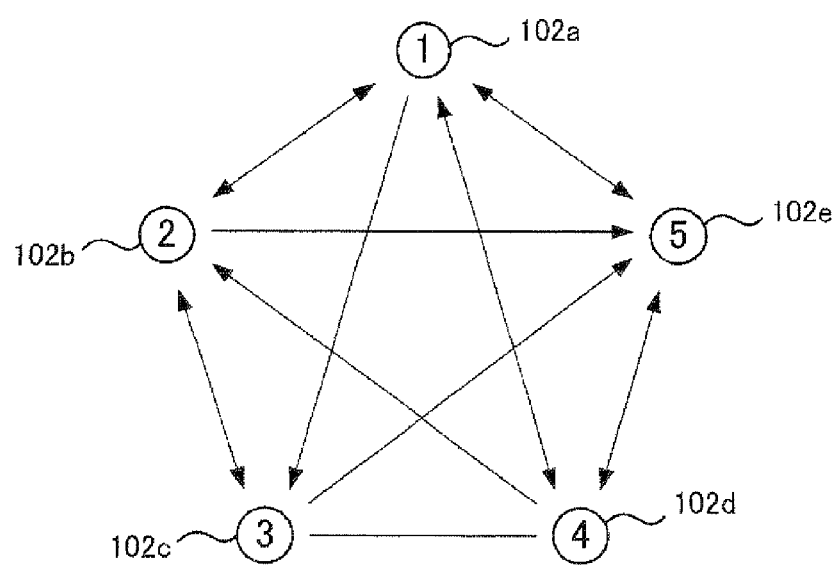
FIG. 7 is an illustration of the relationship in detection of existence between radio communication terminals in the radio communication system shown in FIG. 6.
FIG. 8 is an illustrative view showing the relationship in detection of existence in the radio communication system according to the first embodiment of the present invention.

FIG. 7 is an illustration of the relationship in detection of existence between radio communication terminals in the radio communication system shown in FIG. 6. In FIG. 7, a left column indicates subjects of detection while an upper column indicates objects of the detection, and o is used when the subject of the detection can detect the presence of the object while x is used when the subject of the detection cannot detect the presence of the object. As seen from FIGS. 6 and 7, for example, the radio communication terminal 102a exists in the communication ranges of the radio communication terminals 102b, 102d and 102e and, hence, it can know the existence thereof. On the other hand, the radio communication terminal 102a exists out of the communication range of the radio communication terminal 102c and, hence, it cannot accurately detect the communication based on the radio communication terminal 102c.

Accordingly, for example, in FIG. 6, when the turn is allocated to the radio communication terminal 102a next to the radio communication terminal 102c under the present condition, the radio communication terminal 102a cannot detect the end of the communication right time period for the radio communication terminal 102c so that difficulty is experienced in normally making the continuous shifting between the communication right time periods. For avoiding this problem, for example, the radio communication terminal accommodating apparatus 101 acquires the information on the other radio communication terminals 102a to 102e, detectable by each of the radio communication terminals 102a to 102e, from each of the radio communication terminals 102a to 102e so as to make out a list shown in FIG. 7 for carrying out the order allocation.

FIG. 8 is an illustrative view showing the relationship in detection of existence in a radio communication system according to the first embodiment of the present invention. Moreover, FIG. 8 is an illustration of the relationship among the radio communication terminals 102a to 102e in the radio communication system shown in FIGS. 6 and 7. In the illustration, when a signal comes from one radio communication terminal to the other radio communication terminal (when the other radio communication terminal exists in the communication range of one radio communication terminal), arrows are drawn in directions from one radio communication terminal to the other radio communication terminal. For example, in FIG. 8, a search is made for a route can be drawn[DI1] with a single stroke which passes through all the radio communication terminals 102a to 102e, and the order of communication right time periods is set according to this route can be drawn with a single stroke (for example, (1)→(3)→(5)→(4)→(2)), thereby enabling the setting of the order which smoothes the shifting among the communication right time periods. Moreover, it is also appropriate that the sequence can be drawn with a single stroke, including the radio communication terminal accommodating apparatus 101, is set therein.

Second Embodiment

Figure 9:
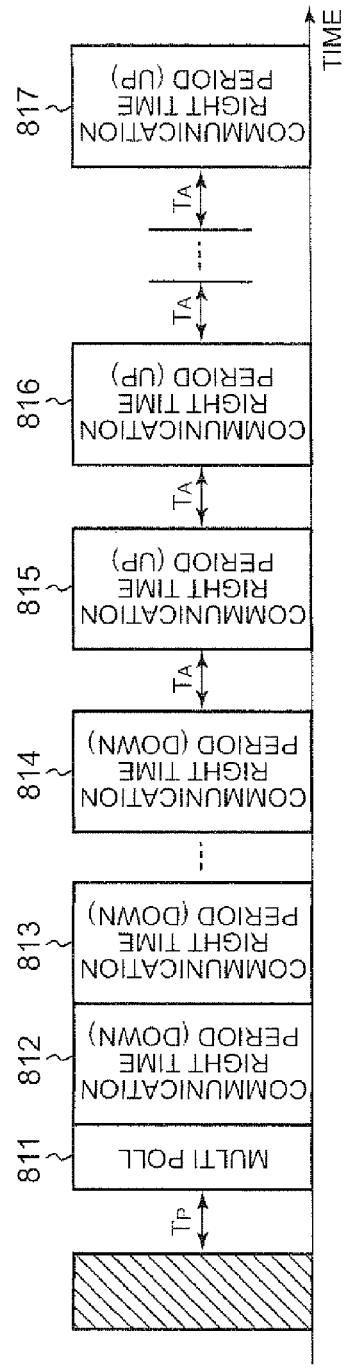
FIG. 9 is a time chart showing a communication according to the second embodiment of the present invention.

Secondly, a description will be given hereinbelow of a second embodiment of the present invention. FIG. 9 is a time chart showing a communication according to a second embodiment of the present invention. As in the case of the first embodiment, the radio communication terminal accommodating apparatus 101 makes the carrier sense on a communication situation of a transmission medium and transmits a multiple-polling signal (MultiPoll) 811 to the transmission medium after waiting for a predetermined carrier sense time $T_p$, from which signal disappears in the transmission medium.

In this multiple-polling signal 811, there are written start time and end time of the communication right with respect to each of the radio communication terminals 102a to 102n and information on downlink (transmission from the radio communication terminal accommodating apparatus 101 to the radio communication terminals 102a to 102n) or uplink (transmission from the radio communication terminals 102a to 102n to the radio communication terminal accommodating apparatus 101). The start time to be written can be a relative time set with reference to one time or it can also be a universal time. Moreover, with respect to communication right time periods 812 to 817, in addition to the start time, it is also possible to write duration of the communication right time period and the end time of the communication right time period.

In addition, the multiple-polling signal 811 can also specify the time of each communication right time period subsequent to the next multiple-polling signal 811 without specifying the time of each communication right time period 812 to 817 immediately after this signal. Moreover, if the length of each of the communication right time periods 812 to 817 and a method of allocating the downlink or uplink, and others, are specified between the radio communication terminal accommodating apparatus 101 and the radio communication terminals 102a to 102n, it is possible to further reduce the information included in the multiple-polling signal 811. The lengths of the communication right time periods 812 to 817 can also be set at different lengths according to the radio communication terminals 102a to 102n.

That is, in the multiple-polling signal 811, for example, there are written the start time of the communication right to be given to each of the radio communication terminals 102a to 102n and the information related to the downlink (DOWN) or uplink (UP), such as:

"radio communication terminal 102a"
start time α, DOWN
"radio communication terminal 102b"
start time β, DOWN
...
"radio communication terminal 102n"
start time γ, UP Moreover, the information on transmission/reception can also be written in place of the downlink/uplink.

As methods in which the radio communication terminal accommodating apparatus 101 allocates the communication rights to the respective radio communication terminals 102a to 102n, as well as the above-described first embodiment, for example, there are a method of allocating communication rights selectively to the radio communication terminals 102a to 102n which make a request for data transmission and a method of allocating the communication rights to all the radio communication terminals 102a to 102n.

In the second embodiment, in the case of the method of allocating the communication rights selectively to the radio communication terminals 102a to 102n which make a request for data transmission, before the transmission of the multiple-polling signal 811, preferably, in addition to collecting the data transmission requests from the respective radio communication terminals 102a to 102n, the radio communication terminal accommodating apparatus 101 collects the time needed for the data transmission, the transmission data volume or the like from the radio communication terminals 102a to 102n. On the basis of the time needed for the data transmission or the transmission data volume, the radio communication terminal accommodating apparatus 101 determines the length of the communication right time period to be allocated to each of the radio communication terminals 102a to 102n, which enables efficiently setting the communication right time period needed for each of the radio communication terminals 102a to 102n. In this connection, for example, by setting a maximum length of the communication right time period to be allocated to each of the radio communication terminals 102a to 102n, it is possible to prevent the communication right time periods to be allocated from being extremely one-sided.

Moreover, the radio communication terminal accommodating apparatus 101 can also use the above-described two methods properly or combine them in accordance with the number of radio communication terminals 102a to 102n to be accommodated, the number of radio communication terminals 102a to 102n which make a request for the data transmission, the lengths of the communication right time periods for which the radio communication terminals 102a to 102n make a request, the transmission data volume, or the like.

After the completion of transmission of the multiple-polling signal 811, the communication is made according to the communication right for each of the radio communication terminals 102a to 102n allocated through the use of the multiple-polling signal 811. In a mode shown by the timing chart of FIG. 9, subsequently to the multiple-polling signal 811, the communication right time periods 812 to 814 for the downlink to the respective radio communication terminals 102a to 102n are continuously specified without providing a non-signal zone and, following this, the communication right time periods 815 to 817 for the uplink from the respective radio communication terminals 102a to 102n are specified in a state spaced by a predetermined time $T_A$ ($<T_p$) sufficiently shorter than a conventional guard time. As in the case of the first embodiment, within the communication right time periods 812 to 817 allocated to predetermined radio communication terminals 102a to 102n, the other non-permitted radio communication terminals 102a to 102n are set so that a transmission operation using this transmission medium is inhibited.

In particular, for the data transmission (downlink) from the radio communication terminal accommodating apparatus 101 to each of the radio communication terminals 102a to 102n, as shown in FIG. 9, since the radio communication terminal accommodating apparatus 101 is not required to confirm the completion of the transmission within each of the communication right time periods 812 to 814, it can set the communication right time periods 812 to 814 continuously without providing a non-signal zone with respect to the respective radio communication terminals 102a to 102n. On the other hand, in the case of the data transmission (uplink) from each of the radio communication terminals 102a to 102n to the radio communication terminal accommodating apparatus 101, for the shifting among the communication right time periods 815 to 817, there is a need to leave space by at least a predetermined time $T_A<(T_p)$.

In this connection, with respect to the time setting on the communication right time periods 815 to 817 specified in the multiple-polling signal 811, in consideration of the predetermined time $T_A$, it is also possible to leave space by the predetermined time $T_A$ between the communication right time period 814 and the communication right period 815 and among the communication right time periods 815 to 817, and further to, when the radio communication terminals 102a to 102n start the uplink, delay the transmission by the predetermined time $T_A$ without leaving space between the communication right time period 814 and the communication right period 815 and among the communication right time periods 815 to 817.

Incidentally, the communication right time period for each of the radio communication terminals 102a to 102n is fixedly determined with time being used as a parameter and, as also described in the first embodiment, when a non-signal time period longer than the predetermined time $T_p$ occurs on the transmission medium, there is a possibility that the communication is made without complying with the time zone set by the multiple-polling signal 811. Accordingly, even in a case in which the communication right set by the multiple-polling signal 811 becomes unnecessary (for example, when the data transmission is canceled although a request is made for the data transmission, or when a communication right is allocated although the data transmission is not made) or when the desired data transmission reaches completion in the middle of the communication right time period allocated to that terminal, there is a need for each of the radio communication terminals 102a to 102n to transmit some signal to the transmission medium within the communication right time period allocated thereto in order to prevent the occurrence of a non-signal time period longer than the predetermined time $T_p$. A signal to be transmitted in this case can be an arbitrary signal.

In this way, the shifting among the communication right time periods 812 to 817 takes place according to the times set by the multiple-polling signal 811 and, when the communication right time period 817 for the radio communication terminal 102n, set lastly, comes to an end, the radio communication system again returns to the distributed control type communication method. In this connection, for example, if the radio communication terminal accommodating apparatus 101 transmits a forced termination signal, then it can also return to the distributed control type communication method. Moreover, it is also possible to, after the end of the communication right time period 817, again transmit the next multiple-polling signal 811 for the shifting to the communication method similar to that shown in FIG. 9 without returning the distributed control.

Third Embodiment

Figure 10:
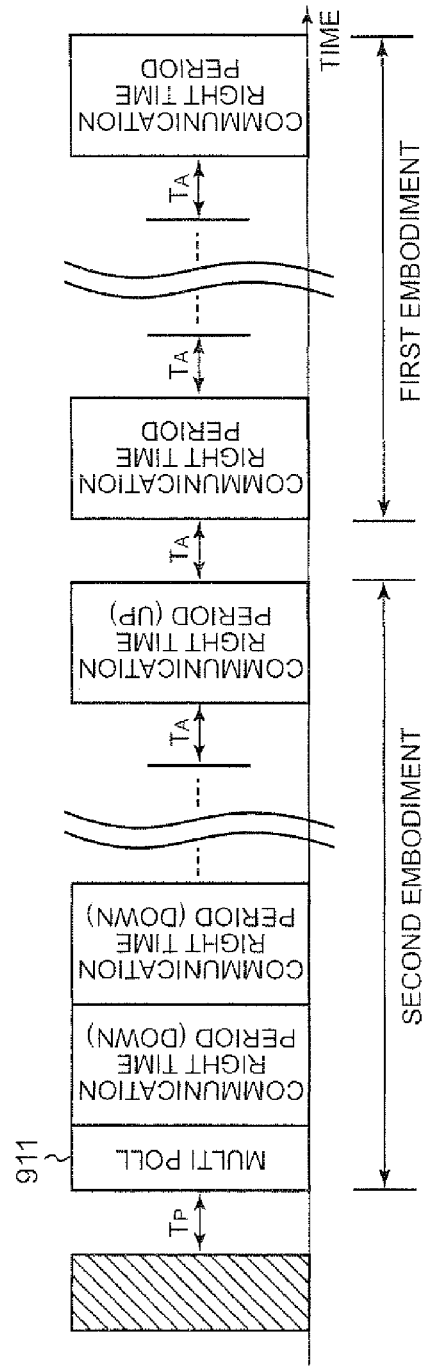
FIG. 10 is a time chart showing a communication according to the third embodiment of the present invention.

Furthermore, a description will be given hereinbelow of a third embodiment of the present invention. FIG. 10 is a time chart showing a communication according to a third embodiment of the present invention. In this third embodiment, a multiple-polling signal 911 has the information (information on the order of communication right time periods) included in the multiple-polling signal 311 described in the first embodiment and the multiple-polling 811 (information on times of the communication right periods and the communication mode) described in the second embodiment, and the radio communication method described in the second embodiment is first implemented and the radio communication method described in the first embodiment is then conducted. For the shifting from the radio communication method described in the second embodiment to the radio communication method described in the first embodiment, the shifting can be made in a state spaced by a predetermined time $T_A$ ($<T_p$) sufficiently shorter than a conventional guard time.

For example, difficulty is encountered in easily carry out the radio communication method described in the second embodiment subsequently to the radio communication method described in the first embodiment. This is because each communication right period time is not fixed in the radio communication method described in the first embodiment, which leads to difficulty being experienced in specifying the end time of a communication according to the radio communication method described in the first embodiment. If the end time of the communication according to the radio communication method described in the first embodiment is specified by compulsion and, when the end time is reached, the shifting is compulsorily made to a communication according to the radio communication method described in the second embodiment even in the middle of the communication, then the radio communication method described in the second embodiment can be conducted subsequently to the radio communication method described in the first embodiment.

Figure 11:
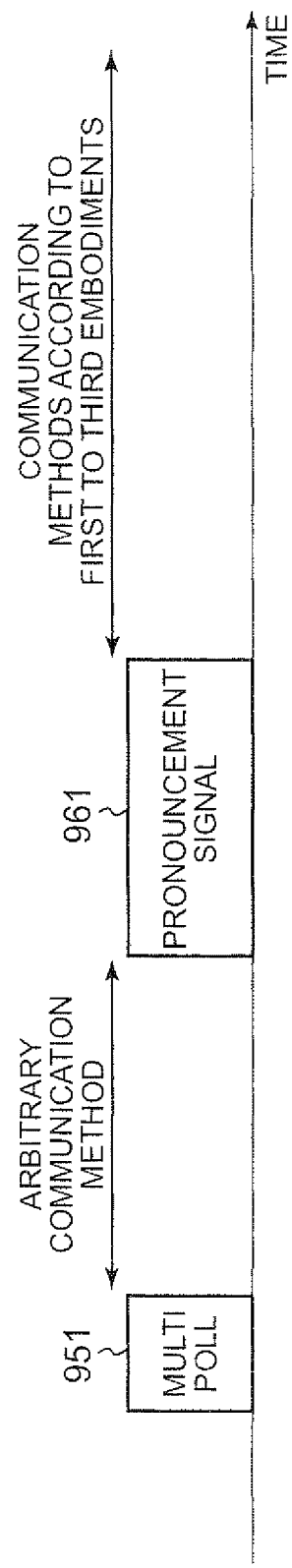
FIG. 11 is a time chart showing one example in the case of shifting to communication methods according to the first to third embodiment of the present invention.

FIG. 11 is a time chart showing one example of the shifting to the communication methods in the first to third embodiments of the present invention. For example, in a case in which the radio communication terminal accommodating apparatus 101 transmits a multiple-polling signal 951 and, after the elapse of a communication time period once taken using an arbitrary communication method, the radio communication terminal accommodating apparatus 101 transmits a signal (pronouncement signal) 961 forming an index indicative of entering the above-described communication methods according to the first to third embodiments at an arbitrary timing, after this pronouncement signal 961, one of the communication methods according to the first to third embodiments can start according to the information on the order or time zone allocated by the multiple-polling signal 951.

In addition, although the first to third embodiments do not particularly touch the directivity of the antenna 11 of the radio communication terminal accommodating apparatus 101, even in a case in which the radio communication terminal accommodating apparatus 101 has an omni-directional antenna, a directional antenna or an antenna capable of producing the directivity, the present invention is also applicable.

Figure 12:
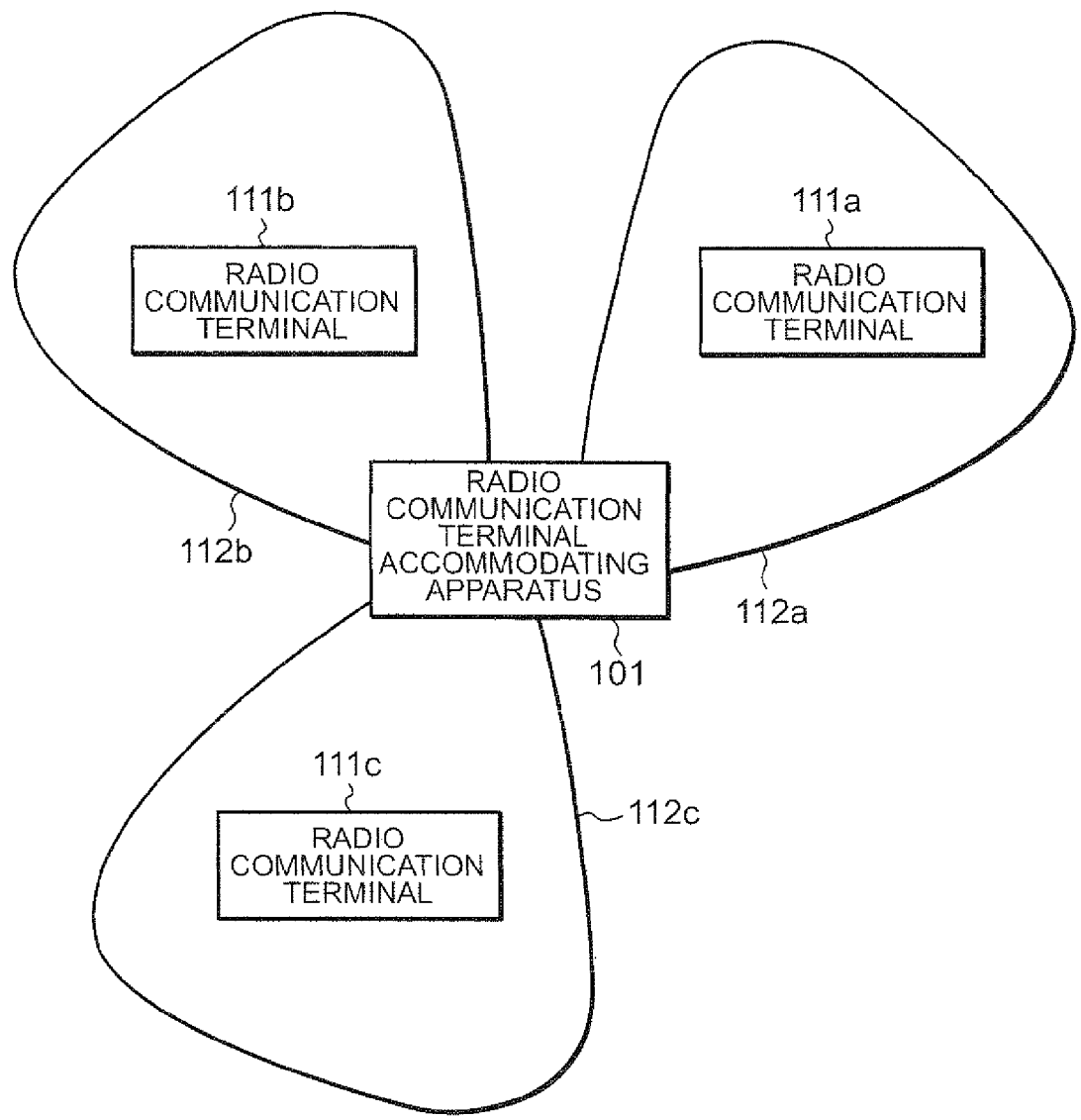
FIG. 12 is an illustrative view showing a case in which a radio communication terminal accommodating apparatus has a directional antenna or has an antenna capable of producing a directivity.
Figure 13:
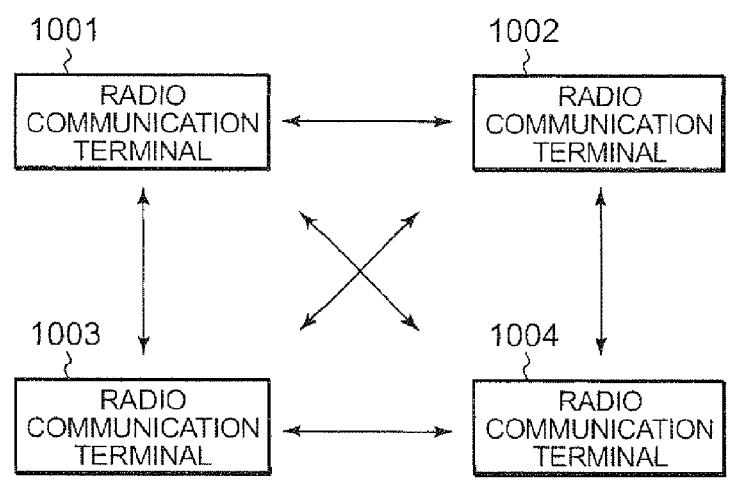
FIG. 13 is an illustration of one example of a distributed control configuration in a conventional radio communication system.
Figure 14:
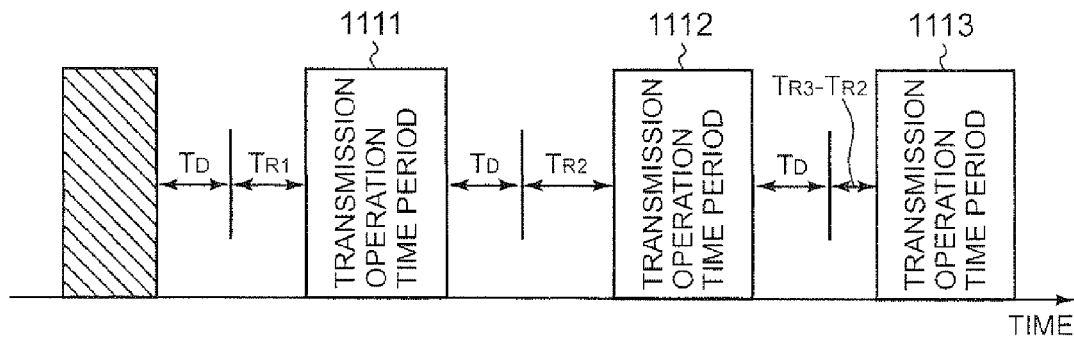
FIG. 14 is a time chart showing one example of a communication to be conducted in the radio communication system shown in FIG. 13.
Figure 15:
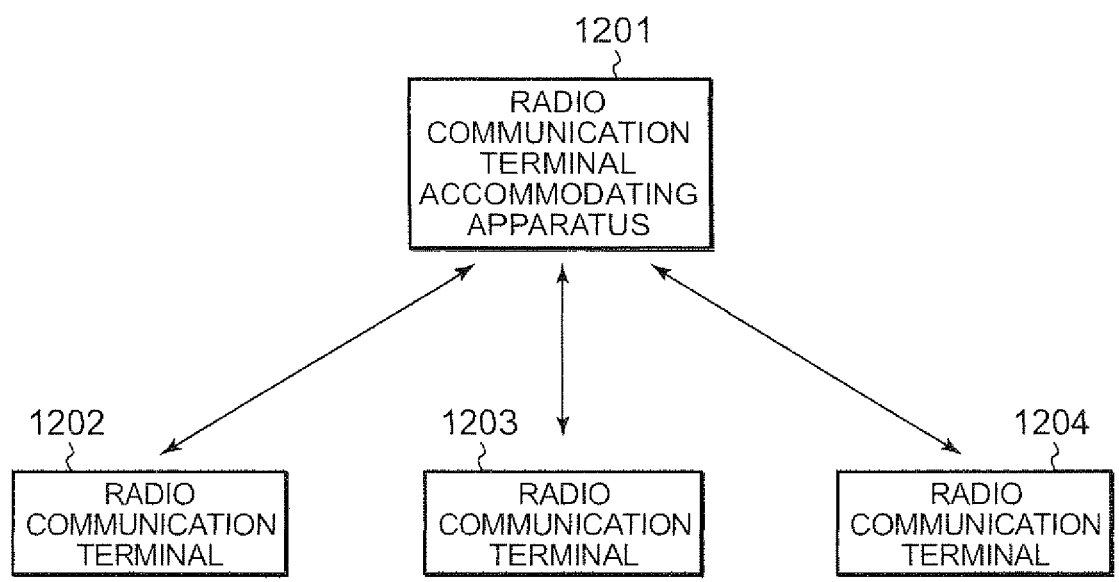
FIG. 15 is an illustration of one example of a centralized control configuration in a conventional radio communication system.
Figure 16:
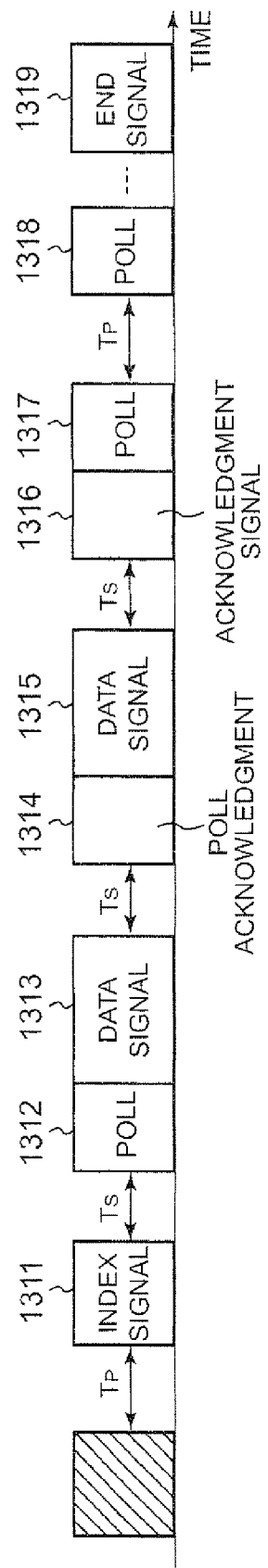
FIG. 16 is a time chart showing a first example of a communication to be conducted in the radio communication system shown in FIG. 15.
Figure 17:
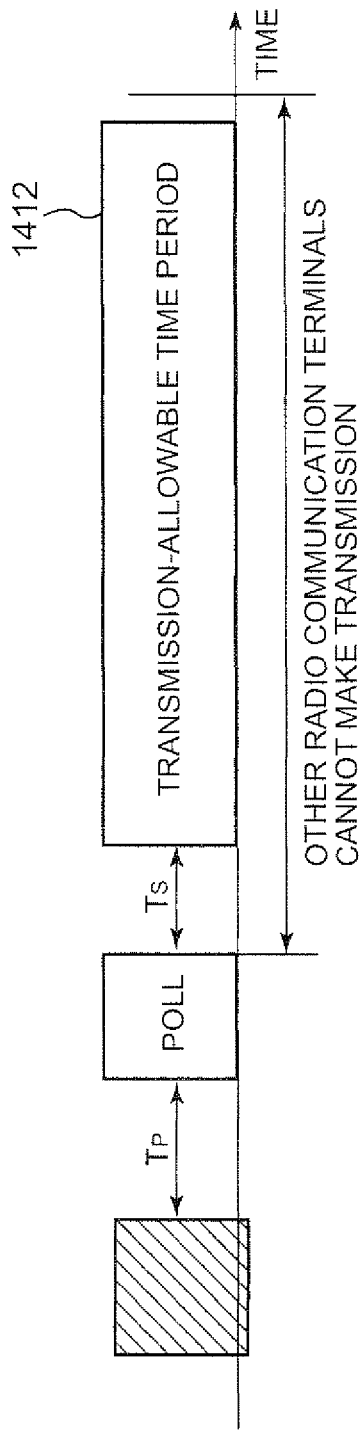
FIG. 17 is a time chart showing a second example of a communication to be conducted in the radio communication system shown in FIG. 15.
Figure 18:
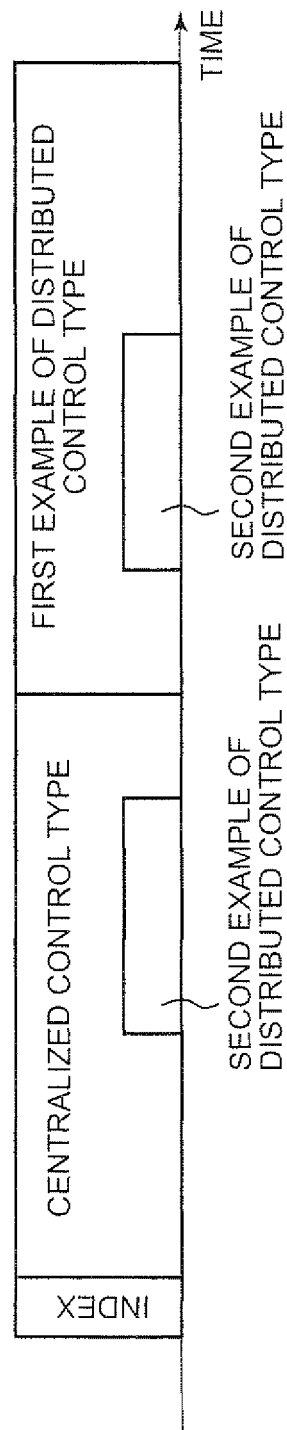
FIG. 18 is an illustrative view showing one example of a communication based on a combination of conventional distributed control type and centralized control type communication methods.

FIG. 12 is an illustrative view showing a case in which a radio communication terminal accommodating apparatus in the first to third embodiment of the present invention has a directional antenna or has an antenna capable of producing a directivity. As shown in FIG. 12, in a case in which the radio communication terminal accommodating apparatus has a directional antenna or has an antenna capable of producing a directivity and communication ranges 112a to 112c based on the directivity control can be established with respect to the positions of radio communication terminals 111a to 111c, the radio communication terminal accommodating apparatus 101 can conduct simultaneously with the radio communication terminals 111a to 111c without interference. That is, the communication between the radio communication terminal accommodating apparatus 101 and each of the radio communication terminals 111a to 111c is made independently of each other without exerting the influence on each other and, even within time zones overlapping with each other (same time zone), the communication rights are allocatable to the plurality of radio communication terminals 111a to 111c. Therefore, the radio communication terminal accommodating apparatus 101 can set the communication right time periods for the respective radio communication terminals 111a to 111c in the same time zone through the use of the multiple-polling signals 811, 911 and 951 which specify the communication right time periods as time zones. In this case, there is no need to use directional antennas as the antennas of the radio communication terminals 111a to 111c.

INDUSTRIAL APPLICABILITY

A radio communication method and radio communication terminal accommodating apparatus according to the present invention can improve the communication throughput while maintaining the interchangeability with a radio communication system or radio communication method employing a time division multiple access using carrier sense in a conventional multiple access system, and they are useful as a radio communication method for use in a radio communication system made to conduct data transmission/reception among a plurality of radio communication terminals through the use of radio communications and as a radio communication terminal accommodating apparatus made to accommodate the plurality of radio communication terminals in the radio communication system.

The invention claimed is:

1. A radio communication terminal which is one of a plurality of radio communication terminals, a communication of each of said plurality of radio communication terminals being controlled by a radio communication terminal accommodating apparatus, said radio communication terminal comprising:

an acquiring unit configured to acquire allocation information transmitted from said radio communication terminal accommodating apparatus, said allocation information including information that indicates which communication-right time period is allocated to each of said plurality of radio communication terminals, information on a start time and time length of said communication-right time period and information on a direction of communication between each of said plurality of radio communication terminals and said radio communication terminal accommodating apparatus;

a transmitter configured to transmit a data signal in a communication-right time period which is allocated to said radio communication terminal based on said allocation information and to transmit an arbitrary signal other than said data signal in said communication-right time period if said radio communication terminal need not transmit said data signal;

a receiver configured to receive a pronouncement signal indicative of shifting to a second communication mode which is set according to said allocation information transmitted from said radio transmission terminal accommodating apparatus, after receiving said allocation information; and a shifting unit configured to shift from a first communication mode different from said second communication mode to said second communication mode after receiving said pronouncement signal, the first communication mode having a communication right time period having no-fixed time length.

2. The radio communication terminal according to claim 1, wherein said arbitrary signal is a dummy signal to prevent occurrence of a non-signal time period longer than a predetermined time in said communication-right time period.

3. The radio communication terminal according to claim 1, wherein:
the acquiring unit acquires identification information, said identification information being able to be acquired by monitoring communication between radio communication terminals within a communication area of said radio communication terminal, and
the transmitter transmits said identification information to said radio communication terminal accommodating apparatus.

4. The radio communication terminal according to claim 1, wherein a maximum communication-right time period is set for each of said plurality of radio communication terminals, and shifting to a communication-right time period corresponding to a next turn is forcibly made after said maximum communication-right time period elapses.

5. The radio communication terminal according to claim 1, wherein:
said radio communication terminal accommodating apparatus is made to determine an allocation order of a communication-right permitting occupation of a radio transmission medium with respect to each of said plurality of radio communication terminals so that a radio communication terminal having a succeeding allocated turn can monitor a communication by a radio communication terminal having a preceding allocated turn, and
said radio communication terminal further comprising:
a monitoring unit configured to monitor a communication by a radio communication terminal having an immediately-preceding allocated turn.

6. The radio communication terminal according to claim 5, further comprising a deciding unit configured to decide an incoming of its own communication-right time period and start a communication by its own communication-right, when a non-signal time longer than a predetermined length is detected in the communication with respect to said immediately-preceding allocated turn.

7. The radio communication terminal according to claim 5, wherein the transmitter transmits information indicative of completion of said communication by its own communication-right, when terminating a communication by its own communication-right.

8. The radio communication terminal according to claim 7, further comprising:
a monitoring unit configured to monitor a transmission of information indicative of completion of said communication by said radio communication terminal having said immediately-preceding allocated turn; and
a deciding unit configured to decide an incoming of its own communication-right time period and start a communication by its own communication-right, when detecting that said information indicative of completion of said communication is transmitted by said radio communication terminal having said immediately-preceding allocated turn.

9. The radio communication terminal according to claim 1, wherein, when the communications by all the communication-rights allocated to said plurality of radio communication terminals by said radio communication terminal accommodating apparatus reach completion, said second communication mode in a radio transmission medium is returned to a third communication mode before the allocation of the communication-rights by said radio communication terminal accommodating apparatus.

10. A radio communication method used by each of a plurality of radio communication terminals, a communication of each of said plurality of radio communication terminals being controlled by a radio communication terminal accommodating apparatus, said radio communication method comprising:
acquiring allocation information from said radio communication terminal accommodating apparatus, said allocation information including information that indicates which communication-right time period is allocated to each of said plurality of radio communication terminals, information on a start time and time length of said communication-right time period and information on a direction of communication between each of said plurality of radio communication terminals and said radio communication terminal accommodating apparatus;
transmitting a data signal in said communication-right time period which is allocated to each of said plurality of radio communication terminals based on said allocation information and transmitting an arbitrary signal other than said data signal in said communication-right time period if each of said plurality of radio communication terminals need not transmit said data signal;
receiving a pronouncement signal indicative of shifting to a second communication mode which is set according to said allocation information transmitted from said radio transmission terminal accommodating apparatus, after receiving said allocation information; and
shifting from a first communication mode different from said second communication mode to said second communication mode after receiving said pronouncement signal, the first communication mode having a communication right time period having no-fixed time length.

* * * * *